(12) United States Patent
Hu et al.

(10) Patent No.: US 10,601,577 B2
(45) Date of Patent: Mar. 24, 2020

(54) OPERATION METHOD AND SECURITY CHIP

(71) Applicant: Huawei Technologies Co., Ltd., Shenzhen, Guangdong (CN)

(72) Inventors: Cui Hu, Shanghai (CN); ZhuFeng Tan, Shanghai (CN); Shaojie Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/258,114

(22) Filed: Jan. 25, 2019

(65) Prior Publication Data

US 2019/0173665 A1    Jun. 6, 2019

Related U.S. Application Data

(63) Continuation of application No. PCT/CN2017/094332, filed on Jul. 25, 2017.

(30) Foreign Application Priority Data

Jul. 26, 2016    (CN) .......................... 2016 1 0594595

(51) Int. Cl.
*H04L 29/06* (2006.01)
*H04L 9/00* (2006.01)
(Continued)

(52) U.S. Cl.
CPC .............. *H04L 9/003* (2013.01); *G06F 7/723* (2013.01); *G06F 21/72* (2013.01); *G06F 7/582* (2013.01);
(Continued)

(58) Field of Classification Search
None
See application file for complete search history.

(56) References Cited

U.S. PATENT DOCUMENTS 6,064,740 A * 5/2000 Curiger .................. G06F 7/723
                                                          380/264
6,836,869 B1 * 12/2004 Wyland ................. H03M 13/09
                                                          714/781
(Continued)

FOREIGN PATENT DOCUMENTS

CN        101436932 A      5/2009
CN        103164187 A      6/2013
(Continued)

OTHER PUBLICATIONS

Office Action issued in Chinese Application No. 201610594595.7 dated Sep. 3, 2019, 5 pages.

*Primary Examiner* — Jeffery L Williams
(74) *Attorney, Agent, or Firm* — Fish & Richardson P.C.

(57) ABSTRACT

Embodiments of the present application disclose an operation method. The method includes: obtaining, by the input/output interface, an input ciphertext; performing, by the decryption circuit, a modular exponentiation operation according to the ciphertext and a preset operation parameter; and using, by the microprocessor, an operation result obtained after the modular exponentiation operation as a plaintext obtained after decryption. The performing, by the decryption circuit, a modular exponentiation operation according to the ciphertext and a preset operation parameter is specifically: breaking, by the decryption circuit, the modular exponentiation operation into multiple iterative first operations, where the first operation is a modular square operation or a modular multiplication operation; sending, by the decryption circuit, the ciphertext and the operation parameter to the arithmetic unit; and performing, by the arithmetic unit, the first operation according to the ciphertext and the operation parameter to obtain a modular square value or a modular multiplication value.

20 Claims, 4 Drawing Sheets

(51) Int. Cl.
*G06F 7/72* (2006.01)
*G06F 21/72* (2013.01)
*G06F 7/58* (2006.01)

(52) U.S. Cl.
CPC ........ *G06F 7/588* (2013.01); *H04L 2209/046* (2013.01)

(56) References Cited

U.S. PATENT DOCUMENTS

| | | | |
|---|---|---|---|
| 7,864,951 B2 | 1/2011 | Al-Gahtani et al. | |
| 2002/0021803 A1* | 2/2002 | Solinas | G06F 7/725 380/30 |
| 2004/0078414 A1* | 4/2004 | Geiringer | H04L 9/3093 708/530 |
| 2004/0078570 A1* | 4/2004 | Geiringer | H04L 9/3093 713/165 |
| 2004/0078576 A1* | 4/2004 | Geitinger | G06F 7/582 713/181 |
| 2004/0111459 A1* | 6/2004 | Stojancic | G11C 7/1006 708/491 |
| 2007/0192303 A1* | 8/2007 | Stojancic | G11C 7/1006 |
| 2009/0113252 A1 | 4/2009 | Lambert et al. | |
| 2011/0016167 A1* | 1/2011 | Dupaquis | G06F 7/724 708/250 |
| 2011/0116539 A1* | 5/2011 | He | G06F 17/147 375/240.2 |
| 2011/0216900 A1 | 9/2011 | Yoon et al. | |
| 2012/0057695 A1* | 3/2012 | Lazich | G06F 7/724 380/28 |
| 2019/0173665 A1* | 6/2019 | Hu | G06F 21/72 |

FOREIGN PATENT DOCUMENTS

| | | |
|---|---|---|
| CN | 103944714 A | 7/2014 |
| CN | 104899527 A | 9/2015 |
| CN | 105099684 A | 11/2015 |
| CN | 106254059 A | 12/2016 |
| WO | 2008106793 A1 | 9/2008 |

* cited by examiner

OPERATION METHOD AND SECURITY CHIP

CROSS-REFERENCE TO RELATED APPLICATIONS

This application is a continuation of International Application No. PCT/CN2017/094332 filed on Jul. 25, 2017, which claims priority to Chinese Patent Application No. 201610594595.7 filed on Jul. 26, 2016. The disclosures of the aforementioned applications are hereby incorporated by reference in their entireties.

TECHNICAL FIELD

The present application relates to the field of information security technologies, and in particular, to an operation method and a security chip.

BACKGROUND

A Rivest-Shamir-Adleman (RSA) algorithm is a high-security public key encryption algorithm, and may be applied to encryption and decryption processes of a security chip. The security chip includes a financial integrated circuit (IC) card chip, a mobile payment chip, a Universal Serial Bus (USB) key, and the like. However, with continuous development of password attack technologies, security of the RSA algorithm in the security chip is gradually threatened. Common password attack technologies may be divided into a non-intrusive attack, a semi-intrusive attack, and an intrusive attack. Because the semi-intrusive attack and the non-intrusive attack do not cause permanent damage to the security chip, they become mainstream development directions of the password attack technologies.

Figure 5:
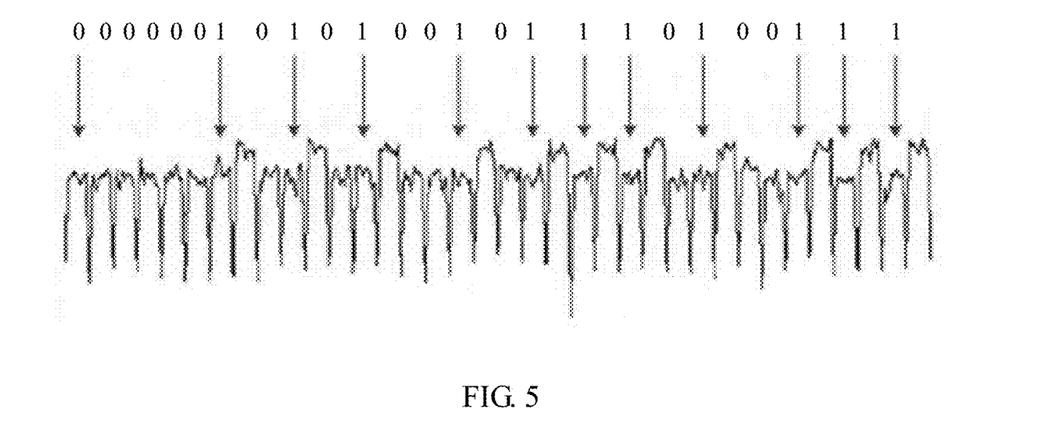
FIG. 5 is a schematic diagram of power consumption analysis according to an embodiment of the application.

It should be understood that, a core process of the RSA algorithm is a modular exponentiation operation. At present, a common method for implementing a modular exponentiation operation by a security chip is to break the modular exponentiation operation into several modular square operations and several modular multiplication operations. In a prior-art security chip, a modular square operation and a modular multiplication operation are implemented by using two different hardware circuits, and therefore, it is difficult for the security chip to resist a simple power analysis (SPA) attack in non-intrusive attacks. The meaning of the SPA attack is explained herein. An attacker obtains a power consumption graph (which is shown in FIG. 5) by collecting power consumption that is generated when the RSA algorithm is used during a decryption process, and determines, from the power consumption graph, that an operation corresponding to relatively high peak power consumption is a modular multiplication operation and that an operation corresponding to relatively low peak power consumption is a modular square operation, so as to decipher bits of a private key. It can be learned that, it is difficult for the prior-art security chip to resist an SPA attack, and consequently, a private key is deciphered and low security is caused.

SUMMARY

Embodiments of the present application provide an operation method and a security chip, to resist an SPA attack and improve security.

A first aspect of the embodiments of the present application provides an operation method, where the method is applied to a security chip, the security chip includes an input/output interface, a decryption circuit, a microprocessor, and an arithmetic unit, and the method includes: obtaining, by the input/output interface, an input ciphertext; performing, by the decryption circuit, a modular exponentiation operation according to the ciphertext and a preset operation parameter; and using, by the microprocessor, an operation result obtained after the modular exponentiation operation as a plaintext obtained after decryption, where the operation of performing, by the decryption circuit, a modular exponentiation operation according to the ciphertext and a preset operation parameter is specifically: breaking, by the decryption circuit, the modular exponentiation operation into multiple iterative first operations, where the first operation is a modular square operation or a modular multiplication operation; sending, by the decryption circuit, the ciphertext and the operation parameter to the arithmetic unit, and performing, by the arithmetic unit, the first operation according to the ciphertext and the operation parameter to obtain a modular square value or a modular multiplication value, where the operation parameter includes a parameter m and a modulus N that is preset to a fixed value; and if the current first operation is an initial first operation, m is a preset initial value; or if the first current operation is not an initial first operation, m is a modular square value or a modular multiplication value obtained after a previous first operation; and using, by the decryption circuit, a modular square value or a modular multiplication value obtained after the arithmetic unit performs the first operation for the last time, as the operation result of the modular exponentiation operation. It can be learned that, the modular square operation and the modular multiplication operation may be implemented by using same hardware (that is, the arithmetic unit), so that the two types of operations consume same power and cannot be differentiated according to power consumption. In this way, an SPA attack can be resisted and security can be improved.

In a first possible implementation of the first aspect, the operation of performing, by the arithmetic unit, the first operation according to the ciphertext and the operation parameter to obtain a modular square value or a modular multiplication value is specifically: performing, by the arithmetic unit, a modular multiplication operation on m and N according to a formula $X = m^2 \bmod N$ to obtain the modular square value, or performing a modular square operation on the ciphertext C, m, and N according to a formula $Y = m * C \bmod N$ to obtain the modular multiplication value.

In a second possible implementation of the first aspect, the arithmetic unit includes a mask circuit, a hardware acceleration circuit, and an unmask circuit, and the performing, by the arithmetic unit, the first operation according to the ciphertext and the operation parameter to obtain a modular square value or a modular multiplication value is specifically: performing, by the mask circuit, a mask operation on the ciphertext and/or the operation parameter by using a random number to obtain a mask parameter, where the mask parameter includes a masked ciphertext and the operation parameter, or includes the ciphertext and a masked operation parameter, or includes a masked ciphertext and a masked operation parameter; performing, by the hardware acceleration circuit, the first operation on the mask parameter to obtain a masked modular square value or a masked modular multiplication value; and performing, by the unmask circuit, an unmask operation on the masked modular square value or the masked modular multiplication value to correspondingly obtain the modular square value or the modular multiplication value. An advantage lies in that: Performing masking on the ciphertext and the operation parameter can enhance randomness of the ciphertext and the operation parameter; in addition, because values of r used in each round of mask operation are different, there is no correlation between power consumption generated in all rounds of mask operations, and therefore a DPA (Differential Power Analysis, differential power analysis) attack can be resisted and security can be improved.

With reference to the second possible implementation of the first aspect, in a third possible implementation, the arithmetic unit further includes a check circuit, and before the performing, by the unmask circuit, an unmask operation on the masked modular square value or the masked modular multiplication value to correspondingly obtain the modular square value or the modular multiplication value, the following operations are further performed: performing, by the check circuit, a second operation on the masked modular square value or the masked modular multiplication value to obtain a check value; and determining, by the check circuit, that the check value is equal to a preset value, where the preset value is m if the second operation is performed on the masked modular square value currently, or the preset value is m or C if the second operation is performed on the masked modular multiplication value currently. An advantage lies in that: Check fails upon a fault injection attack, and the modular square value or the modular multiplication value cannot be obtained, and therefore the fault injection attack can be resisted and security can be improved.

With reference to the third possible implementation of the first aspect, in a fourth possible implementation, the operation of performing, by the mask circuit, a mask operation on the ciphertext and the operation parameter by using a random number is specifically: obtaining, by the mask circuit, a masked value of m according to a formula X1=+r)mod N, where X1 indicates the masked value of m, and r indicates the random number; and/or obtaining, by the mask circuit, a masked value of C according to a formula Y1=(C+r)mod N, (where Y1 indicates the masked value of C, and r indicates the random number.

With reference to the fourth possible implementation of the first aspect, in a fifth possible implementation, the performing, by the hardware acceleration circuit, the first operation on the mask parameter to obtain a masked modular square value or a masked modular multiplication value is specifically: obtaining, by the hardware acceleration circuit, the masked modular square value according to a formula X2=m*X1 mod N, where X2 indicates the masked modular square value; or obtaining, by the hardware acceleration circuit, the masked modular multiplication value according to a formula Y2=m*Y1 mod N, where Y2 indicates the masked modular multiplication value.

With reference to the fifth possible implementation of the first aspect, in a sixth possible implementation, the operation of performing, by the check circuit, a second operation on the masked modular square value or the masked modular multiplication value to obtain a check value is specifically: obtaining, by the check circuit, the check value according to a formula X3=(X2−m*r)*m$^{-1}$ mod N if the second operation is performed on the masked modular square value currently, where X3 indicates the check value; or obtaining, by the check circuit, the check value according to a formula Y3=(Y2−m*r)*m$^{-1}$ mod N if the second operation is performed on the masked modular multiplication value currently, where Y3 indicates the check value.

With reference to the sixth possible implementation of the first aspect, in a seventh possible implementation, the operation of performing, by the unmask circuit, an unmask operation on the masked modular square value or the masked modular multiplication value to correspondingly obtain the modular square value or the modular multiplication value is specifically: obtaining, by the unmask circuit, a modular square value X according to a formula X=X2−m*r mod N if the unmask operation is performed on the masked modular square value currently; or obtaining, by the unmask circuit, a modular multiplication value Y according to a formula Y=Y2−m*r mod N if the unmask operation is performed on the masked modular multiplication value currently.

With reference to the third possible implementation of the first aspect, in an eighth possible implementation, the arithmetic unit further includes a reset circuit, and after the performing, by the check circuit, a second operation on the masked modular square value or the masked modular multiplication value to obtain a check value, the following operations are further performed: if the check value is not equal to the preset value, clearing, by the reset circuit, the ciphertext and the operation parameter and triggering stop of the operations. An advantage lies in that: Input parameters are cleared and the operations are stopped when a fault inject attack is discovered, and therefore security is improved.

With reference to the second possible implementation of the first aspect, in a ninth possible implementation, the random number is generated by a true random number generator, or the random number is generated by a pseudo-random number generator according to a seed after a true random number generator generates the seed.

A second aspect of the embodiments of the present application provides a security chip, where the security chip has a function of implementing the method provided in the first aspect. The function may be implemented by using hardware, or may be implemented by executing corresponding software by hardware. The hardware or software includes one or more modules corresponding to the foregoing functions.

A third aspect of the embodiments of the present application provides a security chip, including a microprocessor, a memory, and an input/output interface, where the memory stores a set of program code, and the microprocessor is configured to invoke the program code stored in the memory to implement the method provided in the first aspect.

It can be learned from the foregoing that, the security chip provided in the embodiments of the present application includes the input/output interface, the decryption circuit, the microprocessor, and the arithmetic unit. During a decryption process in which the security chip converts the ciphertext to the plaintext, the input/output interface first obtains the input ciphertext, the decryption circuit then performs the modular exponentiation operation according to the ciphertext and the preset operation parameter, and the microprocessor uses the operation result obtained after the modular exponentiation operation as the plaintext obtained after decryption. When performing the modular exponentiation operation according to the ciphertext and the preset operation parameter, the decryption circuit first breaks the modular exponentiation operation into multiple iterative first operations, where the first operation is the modular square operation or the modular multiplication operation, and then sends the ciphertext and the operation parameter to the arithmetic unit, and the arithmetic unit performs the first operation according to the ciphertext and the operation parameter to obtain the modular square value or the modular multiplication value. It can be learned that, the same hardware (the arithmetic unit) may be used to obtain either the modular square value or the modular multiplication value, so that the two types of operations consume the same power and cannot be differentiated according to power consumption. In this way, an SPA attack can be resisted and security can be improved.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

For ease of understanding the embodiments of the present application, an implementation process of an RSA algorithm is first described briefly. The RSA algorithm relates to three parameters: a modulus N, a public key e, and a private key d. N is a product of two large prime numbers p and q, e and $(p-1)*(q-1)$ are relatively prime, and $e*d \bmod((p-1)*(q-1))=1$. Assuming that m is a plaintext and C is a ciphertext, an encryption process of a security chip may be represented as $C=m^e \bmod N$, and correspondingly, a decryption process thereof may be represented as $m=C^d \bmod N$. It can be learned that, during the decryption process, a core process of the RSA algorithm is a modular exponentiation operation.

A common method for implementing a modular exponentiation operation by a prior-art security chip is a binary modular exponentiation method (Montgomery modular exponentiation method). In specific implementation, an operation procedure of the decryption process is as follows: ① inputting C, N, and $d=(d_i, \ldots, d_2, d_1)_2$, where $( \ldots )_2$ indicates a binary array, and i is a positive integer; ② setting an initial value of m to 1; and ③ performing counting starting from k to 1, where k is a positive integer; calculating $m=m^2 \bmod N$ each time counting is performed; and additionally calculating $m=m*C \bmod N$ when $e_k=1$. After the foregoing operations ①, ②, and ③ are performed, a finally output value of m may be $C^d \bmod N$, and the modular exponentiation operation is implemented. It can be learned that, a nature of implementing the modular exponentiation operation is to break the modular exponentiation operation into several modular square operations $m^2 \bmod N$ and several modular multiplication operations $m*C \bmod N$. It should be pointed out that, the prior-art security chip has the following problems when implementing the modular exponentiation operation:

First, it is difficult to resist an SPA attack in non-intrusive attacks. The reason is that: In the prior-art security chip, a modular square operation and a modular multiplication operation are implemented by using two different hardware, and an attacker can determine, by collecting power consumption of the security chip and analyzing a power consumption graph shown in FIG. 5, that an operation corresponding to relatively high peak power consumption is a modular multiplication operation and that an operation corresponding to relatively low peak power consumption is a modular square operation, so as to decipher bits of a private key.

Second, it is difficult to resist a fault injection attack in semi-intrusive attacks. In specific implementation, an attacker injects a fault into 1 bit of the private key d during a modular exponentiation operation. Assuming that a private key obtained after fault injection is $d\hat{\ }$, $m=C^d \bmod N$ when no fault is injected, and $m\hat{\ }=C^{d\hat{\ }} \bmod N$ after the fault is injected. Then, by means of analysis of a ratio relationship between m and m$\hat{\ }$, data of the 1 bit into which the fault is injected can be inferred. For example, the fault is injected into the last bit of d$\hat{\ }$. When data of the last bit changes from 0 to 1 $(m\hat{\ }/m) \bmod N=C$. When the data of the last bit changes from 1 to 0 $(m/m\hat{\ }) \bmod N=C$. According to this difference, it can be inferred whether the data of the last bit is 0 or 1.

Figure 1:
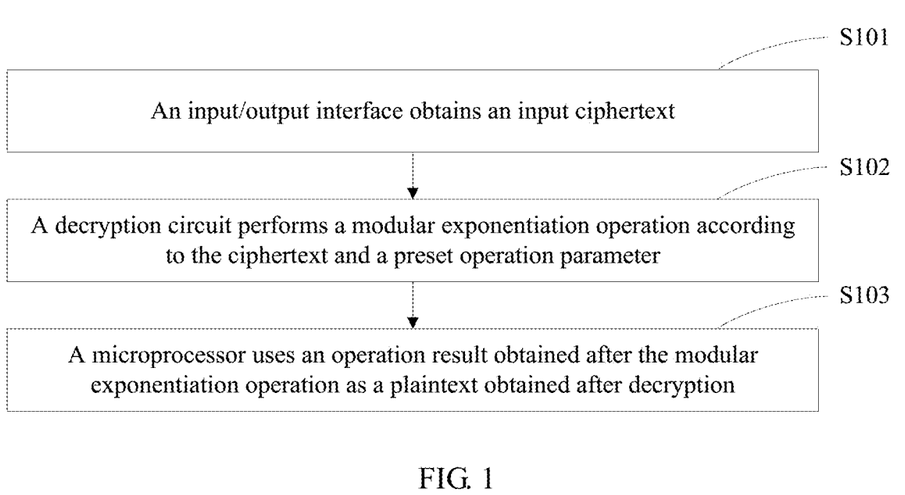
FIG. 1 is a schematic flowchart of an operation method according to an embodiment of the present application.

FIG. 1 is a schematic flowchart of an operation method in an embodiment of the present application. The method is applied to a security chip, and the security chip includes an input/output interface, a decryption circuit, a microprocessor, and an arithmetic unit. As shown in the figure, a procedure of the operation method in this embodiment may include the following steps.

S101: The input/output interface obtains an input ciphertext.

Specifically, when a ciphertext is input from the outside to the security chip for requesting decryption, the input/output interface in the security chip obtains the input ciphertext.

S102: The decryption circuit performs a modular exponentiation operation according to the ciphertext and a preset operation parameter.

It can be learned from the foregoing described content that, a core of a decryption process is a modular exponentiation operation. The modular exponentiation operation may be broken into multiple modular square operations $m=m^2 \bmod N$ and multiple modular multiplication operations $m=m*C \bmod N$. Specifically, the decryption circuit in the security chip first breaks the modular exponentiation operation into multiple iterative first operations, where the first operation is a modular square operation or a modular multiplication operation; the decryption circuit then sends the ciphertext and the operation parameter to the arithmetic unit, and the arithmetic unit performs the first operation according to the ciphertext and the operation parameter to obtain a modular square value or a modular multiplication value; and the decryption circuit uses a modular square value or a modular multiplication value obtained after the arithmetic unit performs the first operation for the last time, as an operation result of the modular exponentiation operation.

It should be pointed out that, the operation parameter includes a parameter m and a modulus N that is preset to a fixed value. If the current first operation is an initial first operation, m is a preset initial value (for example, the initial value is preset to 1); or if the current first operation is not an initial first operation, m is a modular square value or a modular multiplication value obtained after a previous first operation. That is, values of m in the operation parameter that is sent by the decryption circuit to the arithmetic unit each time are different, and m is assigned a value for multiple times and used in multiple iterative operations.

Optionally, an expression of the first operation may be represented as $F(S)=m*S \mod N$, where S indicates an operand. Correspondingly, that the arithmetic unit performs the first operation according to the ciphertext and the operation parameter to obtain a modular square value or a modular multiplication value is specifically: When the decryption circuit sends only m and N to the arithmetic unit, the arithmetic unit performs a modular multiplication operation on m and N according to a formula $X=m^2 \mod N$ to obtain the modular square value; or when the decryption circuit sends the ciphertext C, m, and N to the arithmetic unit, the arithmetic unit performs a modular square operation on the ciphertext C, m, and N according to a formula $Y=m*C \mod N$ to obtain the modular multiplication value.

It should further be pointed out that, the arithmetic unit in this embodiment of the present application is not hardware into which a modular square operation circuit and a modular multiplication operation circuit are integrated, that is, the arithmetic unit is hardware that includes only one operation circuit. The operation circuit can implement both the modular square operation and the modular multiplication operation, and consumes same power when performing the modular square operation and the modular multiplication operation.

S103: The microprocessor uses an operation result obtained after the modular exponentiation operation as a plaintext obtained after decryption.

It can be learned from the foregoing described content that, according to different power exponents of the modular exponentiation operation, a modular square value or a modular multiplication value may be obtained after the first operation is performed for the last time. Specifically, the microprocessor in the security chip uses the modular square value or the modular multiplication value obtained after the first operation performed by the arithmetic unit for the last time during the decryption process as the plaintext.

It can be learned from the foregoing that, the security chip provided in this embodiment of the present application includes the input/output interface, the decryption circuit, the microprocessor, and the arithmetic unit. During the decryption process in which the security chip converts the ciphertext to the plaintext, the input/output interface first obtains the input ciphertext, the decryption circuit then performs the modular exponentiation operation according to the ciphertext and the preset operation parameter, and the microprocessor uses the operation result obtained after the modular exponentiation operation as the plaintext obtained after decryption. When performing the modular exponentiation operation according to the ciphertext and the preset operation parameter, the decryption circuit first breaks the modular exponentiation operation into multiple iterative first operations, where the first operation is the modular square operation or the modular multiplication operation, and then sends the ciphertext and the operation parameter to the arithmetic unit, and the arithmetic unit performs the first operation according to the ciphertext and the operation parameter to obtain the modular square value or the modular multiplication value. It can be learned that, same hardware (the arithmetic unit) may be used to obtain either the modular square value or the modular multiplication value, so that the two types of operations consume the same power and cannot be differentiated according to power consumption. In this way, an SPA attack can be resisted and security can be improved.

Figure 2:
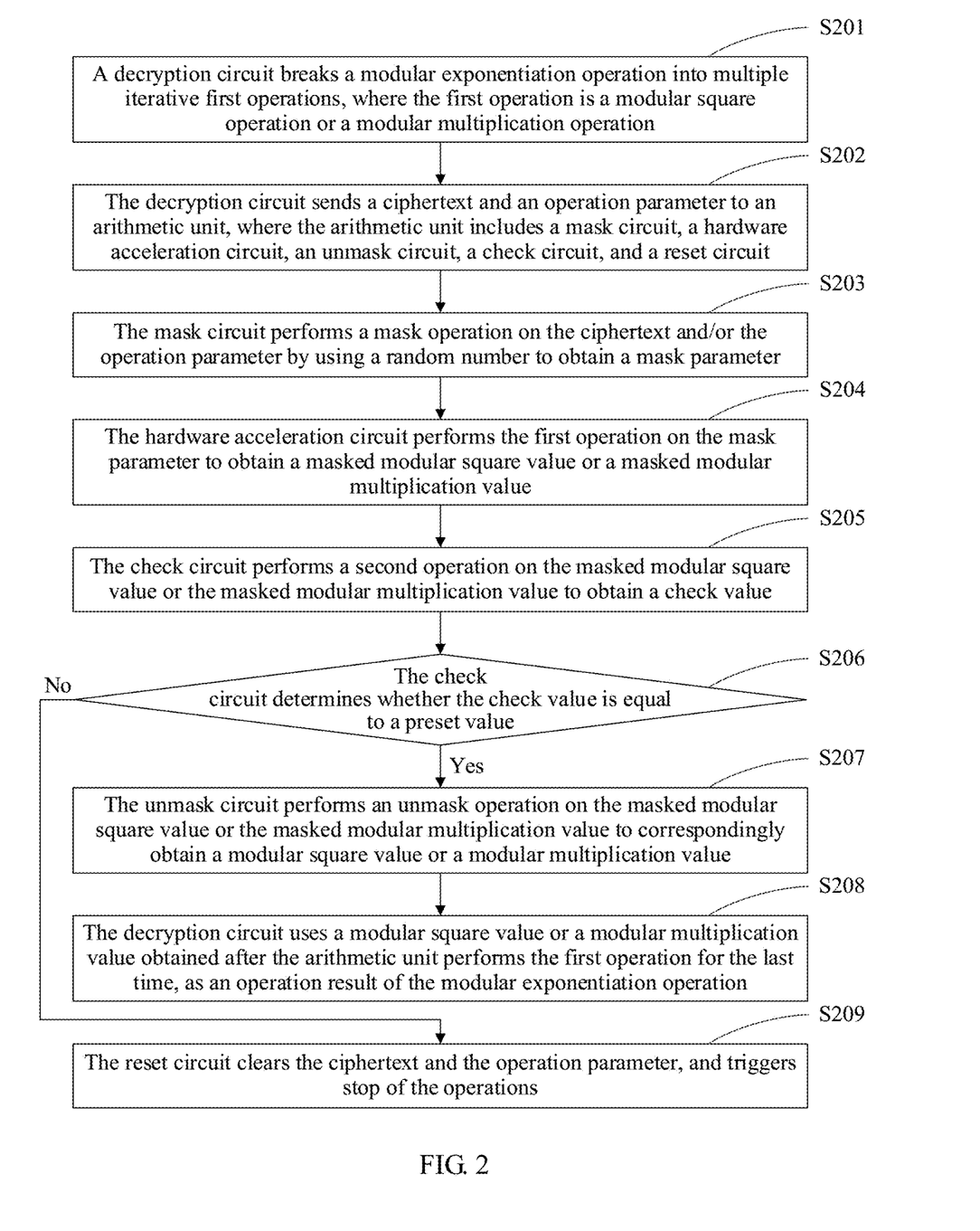
FIG. 2 is a schematic flowchart of another operation method according to an embodiment of the present application.

FIG. 2 is a schematic flowchart of another operation method in an embodiment of the present application. Step S102 in the embodiment described with reference to FIG. 1 is further described in detail in the method. As shown in the figure, a procedure of the operation method in this embodiment may include the following steps.

S201: The decryption circuit breaks the modular exponentiation operation into multiple iterative first operations, where the first operation is a modular square operation or a modular multiplication operation.

It can be learned from the foregoing described content that, a core of a decryption process is a modular exponentiation operation. The modular exponentiation operation may be broken into multiple modular square operations $m=m^2 \mod N$ and multiple modular multiplication operations $m=m*C \mod N$. Specifically, the decryption circuit breaks the modular exponentiation operation into multiple iterative first operations, where the first operation is a modular square operation or a modular multiplication operation.

S202: The decryption circuit sends the ciphertext and the operation parameter to the arithmetic unit, where the arithmetic unit includes a mask circuit, a hardware acceleration circuit, an unmask circuit, a check circuit, and a reset circuit.

The operation parameter includes a parameter m and a modulus N that is preset to a fixed value. If a current first operation is an initial first operation, m is a preset initial value (for example, the initial value is preset to 1); or if a current first operation is not an initial first operation, m is a modular square value or a modular multiplication value obtained after a previous first operation. That is, values of m in the operation parameter that is sent by the decryption circuit to the arithmetic unit each time are different, and m is assigned a value for multiple times and used in multiple iterative operations.

S203: The mask circuit performs a mask operation on the ciphertext and/or the operation parameter by using a random number to obtain a mask parameter.

In other words, the obtained mask parameter includes a masked ciphertext and the operation parameter, or includes the ciphertext and a masked operation parameter, or includes a masked ciphertext and a masked operation parameter.

Optionally, a manner of the mask operation may be masking by addition or subtraction, masking by multiplication or division, masking by a hybrid operation or another operation, or the like, and is not enumerated exhaustively herein. Masking by addition is used as an example. An expression of the mask operation may be represented as $F(S)=(S+r) \mod N$, where S indicates an object to be masked, and r indicates a random number.

In an optional implementation, in specific implementation, if the first operation in the following step S204 is to obtain a modular square value, the mask circuit obtains a masked value of the parameter m according to a formula $X1=(m+r) \mod N$ without masking a modulus C, that is, an obtained mask parameter includes the masked value of the parameter m and the unmasked modulus C; or if the first operation in the following step S204 is to obtain a modular multiplication value, the mask circuit obtains a masked value of the modulus C according to a formula $Y1=(C+r) \mod N$ without masking the parameter m, that is, an obtained mask parameter includes the unmasked parameter m and the masked value of the modulus C. It should be understood that, because operations of a same expression use a same hardware circuit, a same hardware circuit is used for the mask operation on either the parameter m or the modulus C, and same power consumption is generated. Therefore, an SPA attack can be resisted in this implementation.

It should be noted that, the random number r is generated at random. Therefore, values of r used in all rounds of mask operations are different. Because the values of r used in all the rounds of mask operations are different, there is no correlation between power consumption generated in all the rounds of mask operations. Therefore, a DPA attack can be resisted. The DPA attack means that bits of a private key are deciphered by analyzing the correlation of the power consumption generated in all rounds of operations. Optionally, the random number may be generated by a true random number generator. Alternatively, the random number may be generated by a pseudorandom number generator according to a seed after a true random number generator generates the seed. Compared with the former, this manner actually generates the random number faster.

S204: The hardware acceleration circuit performs the first operation on the mask parameter to obtain a masked modular square value or a masked modular multiplication value.

Optionally, an expression of the first operation may be represented as $F(S)=m*S \mod N$, where S indicates an operand.

In an optional implementation, in specific implementation, if the current first operation is to obtain a modular square value, a masked modular square value X2 is obtained according to a formula $X2=m*X1 \mod N$; or if the current first operation is to obtain a modular multiplication value, a masked modular multiplication value Y2 is obtained according to a formula $Y2=m*Y1 \mod N$. Likewise, because operations of a same expression use a same hardware circuit, a same hardware circuit is used for the first operation on either X1 or Y1, and same power consumption is generated. Therefore, an SPA attack can be resisted in this implementation.

S205: The check circuit performs a second operation on the masked modular square value or the masked modular multiplication value to obtain a check value.

Optionally, if the second operation is performed on the masked modular square value currently, a preset value is the parameter m; or if the second operation is performed on the masked modular multiplication value currently, the preset value may be the parameter m or the parameter C.

Correspondingly, if the mask operation uses the foregoing manner of masking by addition and the preset value is the parameter m, an expression of the second operation may be represented as $F(S)=(S-m*r)*m^{-1} \mod N$, where S indicates an operand.

In an optional implementation, in specific implementation, if the second operation is performed on the masked modular square value currently, a check value X3 is obtained according to a formula $X3=(X2-m*r)*m^{-1} \mod N$; or if the second operation is performed on the masked modular multiplication value currently, a check value Y3 is obtained according to a formula $Y3=(Y2-m*r)*m^{-1} \mod N$. Likewise, because operations of a same expression use a same hardware circuit, a same hardware circuit is used for the second operation on either X2 or Y2, and same power consumption is generated. Therefore, an SPA attack can be resisted in this implementation.

$X3=m$ can be obtained according to $X3=(X2-m*r)*m^{-1} \mod N$. A specific derivation process is as follows:

① Given: $X2=m*X1 \mod N$, and then the following formula is obtained:

$$X3=(m*X1 \mod N-m*r)*m^{-1} \mod N=(X1-r)\mod N;$$
and

② Given: $X1=(m+r)\mod N$, and then the following formula is obtained:

$$X3=[(m+r)\mod N-r] \mod N=m.$$

In addition, $Y3=C$ can be obtained according to $Y3=(Y2-m*r)*m^{-1} \mod N$. A specific derivation process is as follows:

① Given: $Y2=m*Y1 \mod N$, and then the following formula is obtained:

$$Y3=(m*Y1 \mod N-m*r)*m^{-1} \mod N=(Y1-r)\mod N;$$
and

② Given: and then the following formula is obtained:

$$Y3=[(C+r)\mod N-r] \mod N=C.$$

It can be learned from the foregoing that, in this implementation, an objective of the second operation is to obtain the parameter before masking according to an output masked value, that is, the obtained check value is the parameter before masking.

S206: The check circuit determines whether the check value is equal to a preset value.

Specifically, if it is determined that the check value is equal to the preset value, step S207 is performed; or if it is determined that the check value is not equal to the preset value, step S208 is performed.

The preset value is equal to the ciphertext or the operation parameter before masking. Normally, the obtained check value is the ciphertext or the operation parameter before masking, and the preset value is also the ciphertext or the operation parameter before masking. Therefore, the check value is equal to the preset value, and then step S207 is performed. However, upon a fault injection attack, the ciphertext and/or the operation parameter is tampered with during an operation process, and the obtained check value becomes a modified ciphertext or operation parameter, not the original ciphertext or operation parameter. Therefore, the check value is not equal to the preset value, and then step S208 is performed. It can be learned that, the fault injection attack can be resisted and security can be improved in this embodiment of the present application.

It should be pointed out that a check manner in the prior art has also been proposed. In this check manner, check is performed on a result of an entire modular exponentiation operation, and the result of the modular exponentiation operation goes wrong upon a fault injection attack, so that check on the result cannot succeed, thereby resisting the fault injection attack. Compared with the prior art, the check manner in this embodiment of the present application can be used to complete check before a result of each modular square operation or each modular multiplication operation is obtained, without a need to wait till the entire modular exponentiation operation is completed. This can resist the fault injection attack in a timely manner and improve check efficiency.

Optionally, the preset value may alternatively be equal to an unmasked parameter. In this case, only the following operations need to be performed: correspondingly setting the preset value to the unmasked parameter, and performing the second operation to obtain the unmasked parameter according to an output masked value, and other ideas remain the same.

S207: The unmask circuit performs an unmask operation on the masked modular square value or the masked modular multiplication value to correspondingly obtain a modular square value or a modular multiplication value.

Correspondingly, if the mask operation uses the foregoing manner of masking by addition, an expression of the unmask operation may be represented as $F(S)=(S-m*r) \mod N$, where S indicates an object to be unmasked.

In an optional implementation, in specific implementation, if the first operation in the foregoing step S204 is to obtain a modular square value, a modular square value X is obtained according to a formula $X=X2-m*r \mod N$; or if the first operation in the foregoing step S204 is to obtain a modular multiplication value, a modular multiplication value Y is obtained according to a formula $Y=Y2-m*r \mod N$. Likewise, because operations of a same expression use a same hardware circuit, a same hardware circuit is used for the unmask operation on either X2 or Y2, and same power consumption is generated. Therefore, an SPA attack can be resisted in this implementation.

$X=m^2 \mod N$ can be obtained according to $X=X2-m*r \mod N$. A specific derivation process is as follows:

① Given: $X2=m*X1 \mod N$, and then the following formula is obtained:

$X=X2-m*r \mod N=m*X1 \mod N-m*r \mod N;$

② Given: $X1=(m+r) \mod N$, and then the following formula is obtained:

$X=m*X1 \mod N-m*r \mod N=\{m*[(m+r) \mod N]\} \mod N-m*r \mod N;$

③ According to a modular four arithmetic operations algorithm $a*(b \mod p)=a*b \mod p$, $X=m*(m+r) \mod N-m*r \mod N$ can be obtained; and ④ According to a modular four arithmetic operations algorithm $a \mod p-b \mod p=(a-b) \mod p$, $X=m*m \mod N=m^2 \mod N$ can be obtained.

In addition, $Y=m*C \mod N$ can be obtained according to $Y=Y2-m*r \mod N$. A specific derivation process is as follows:

① Given: $X2=m*X1 \mod N$, and then the following formula is obtained:

$X=X2-m*r \mod N=m*X1 \mod N-m*r \mod N;$

② Given: $Y1=(C+r) \mod N$, and then the following formula is obtained:

$Y=m*X1 \mod N-m*r \mod N=\{m*[(C+r) \mod N]\} \mod N-m*r \mod N;$

③ According to the modular four arithmetic operations algorithm $a*(b \mod p)=a*b \mod p$, $Y=m*(C+r) \mod N-m*r \mod N$ can be obtained; and ④ According to the modular four arithmetic operations algorithm $a \mod p-b \mod p=(a-b) \mod p$, $X=m*C \mod N$ can be obtained.

In other words, the modular square operation and the modular multiplication operation can be implemented in this embodiment of the present application.

S208: The decryption circuit uses a modular square value or a modular multiplication value obtained after the arithmetic unit performs the first operation for the last time, as an operation result of the modular exponentiation operation.

S209: The reset circuit clears the ciphertext and the operation parameter, and triggers stop of the operations.

Specifically, the reset circuit clears the input parameters m, C, N, and optionally a private key d, and triggers stop of all the operations, so as to prevent data from being stolen, and prevent data from continuing to be output to avoid unauthorized analysis of the data.

Optionally, an alarm is sent at the same time when, before, or after the foregoing operation is performed.

It can be learned from the foregoing that, the security chip provided in this embodiment of the present application includes the input/output interface, the decryption circuit, the microprocessor, and the arithmetic unit. During the decryption process in which the security chip converts the ciphertext to the plaintext, the input/output interface first obtains the input ciphertext, the decryption circuit then performs the modular exponentiation operation according to the ciphertext and the preset operation parameter, and the microprocessor uses the operation result obtained after the modular exponentiation operation as the plaintext obtained after decryption. When performing the modular exponentiation operation according to the ciphertext and the preset operation parameter, the decryption circuit first breaks the modular exponentiation operation into multiple iterative first operations, where the first operation is the modular square operation or the modular multiplication operation, and then sends the ciphertext and the operation parameter to the arithmetic unit, and the arithmetic unit performs the first operation according to the ciphertext and the operation parameter to obtain the modular square value or the modular multiplication value. It can be learned that, same hardware (the arithmetic unit) may be used to obtain either the modular square value or the modular multiplication value, so that the two types of operations consume same power and cannot be differentiated according to power consumption. In this way, an SPA attack can be resisted and security can be improved. In addition, parameter comparison check is further performed in this embodiment of the present application. Therefore, a fault injection attack can also be resisted and security can be further improved.

Figure 3:
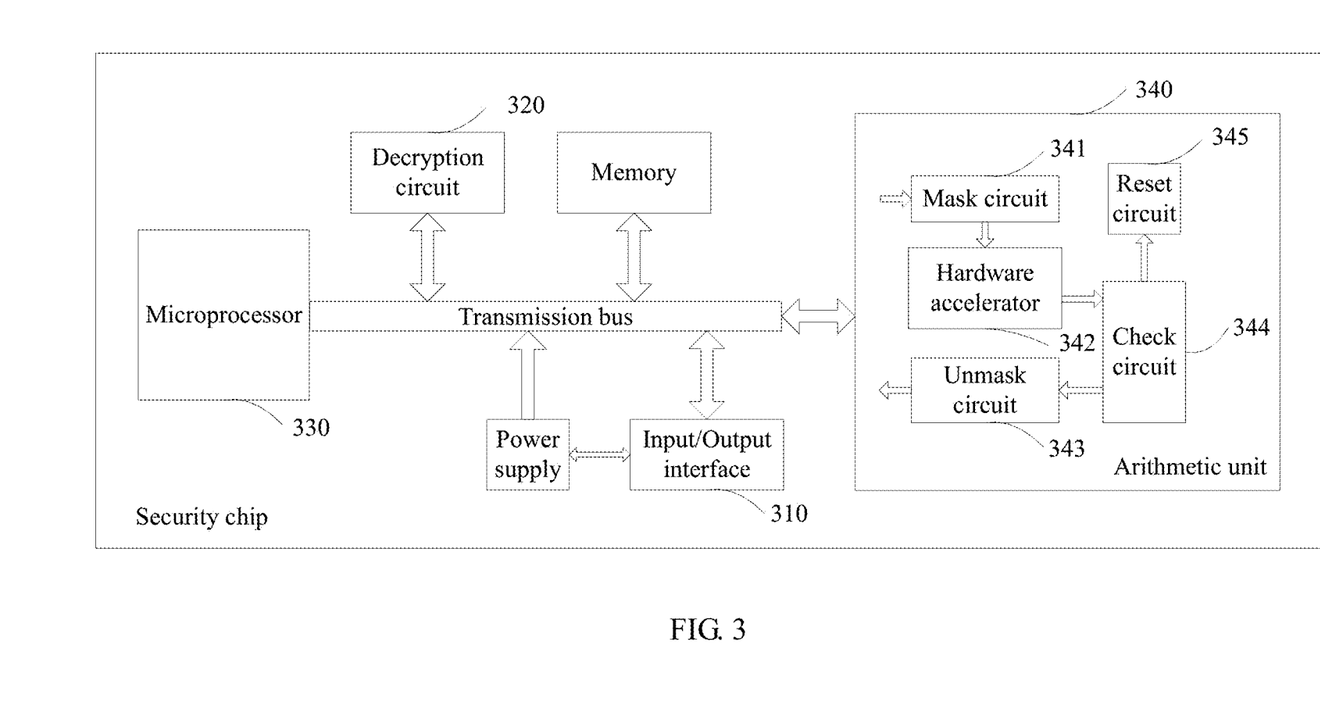
FIG. 3 is a schematic structural diagram of a security chip according to an embodiment of the present application.

FIG. 3 is a schematic structural diagram of a security chip in an embodiment of the present application. The security chip can implement the operation method described in FIG. 1 and FIG. 2. As shown in the figure, the security chip in this embodiment of the present application may include at least an input/output interface 310, a decryption circuit 320, a microprocessor 330, and an arithmetic unit 340.

The input/output interface 310 is configured to obtain a input ciphertext.

Specifically, when a ciphertext is input from the outside to the security chip for requesting decryption, the input/output interface 310 obtains the input ciphertext.

The decryption circuit 320 is configured to perform a modular exponentiation operation according to the ciphertext and a preset operation parameter.

It can be learned from the foregoing described content that, a core of a decryption process is a modular exponentiation operation. The modular exponentiation operation may be mod N broken into multiple modular square operations $m=m^2$ and multiple modular multiplication operations $m=m*C \mod N$. Specifically, the decryption circuit 320 first breaks the modular exponentiation operation into multiple iterative first operations, where the first operation is a modular square operation or a modular multiplication operation; the decryption circuit 320 then sends the ciphertext and the operation parameter to the arithmetic unit 340, and the arithmetic unit 340 performs the first operation according to the ciphertext and the operation parameter to obtain a modular square value or a modular multiplication value; and the decryption circuit 320 uses a modular square value or a modular multiplication value obtained after the arithmetic unit 340 performs the first operation for the last time, as an operation result of the modular exponentiation operation.

It should be pointed out that, the operation parameter includes a parameter m and a modulus N that is preset to a fixed value. If the current first operation is an initial first operation, m is a preset initial value (for example, the initial value is preset to 1); or if the current first operation is not an initial first operation, m is a modular square value or a modular multiplication value obtained after a previous first operation. That is, values of m in the operation parameter that is sent by the decryption circuit 320 to the arithmetic unit 340 each time are different, and m is assigned a value for multiple times and used in multiple iterative operations.

Optionally, an expression of the first operation may be represented as $F(S)=m*S \mod N$, where S indicates an operand. Correspondingly, that the arithmetic unit 340 performs the first operation according to the ciphertext and the operation parameter to obtain a modular square value or a modular multiplication value is specifically: When the decryption circuit 320 sends only m and N to the arithmetic unit, the arithmetic unit 340 performs a modular multiplication operation on m and N according to a formula $X=m^2 \mod N$ to obtain the modular square value; or when the decryption circuit 320 sends the ciphertext C, m and N to the arithmetic unit, the arithmetic unit 340 performs a modular square operation on the ciphertext C, m, and N according to a formula $Y=m*C \mod N$ to obtain the modular multiplication value.

It should further be pointed out that, the arithmetic unit 340 in this embodiment of the present application is not hardware into which a modular square operation circuit and a modular multiplication operation circuit are integrated, that is, the arithmetic unit 340 is hardware that includes only one operation circuit. The operation circuit can implement both the modular square operation and the modular multiplication operation, and consumes same power when performing the modular square operation and the modular multiplication operation.

The microprocessor 330 is configured to use an operation result obtained after the modular exponentiation operation as a plaintext obtained after decryption.

It can be learned from the foregoing described content that, according to different power exponents of the modular exponentiation operation, a modular square value or a modular multiplication value may be obtained after the first operation is performed for the last time. Specifically, the microprocessor 330 uses the modular square value or the modular multiplication value obtained after the first operation is performed for the last time as the plaintext.

Further, referring to FIG. 3, the arithmetic unit 340 shown in the figure may include a mask circuit 341, a hardware acceleration circuit 342, and an unmask circuit 343.

The mask circuit 341 is configured to perform a mask operation on the ciphertext and/or the operation parameter by using a random number to obtain a mask parameter, where the mask parameter includes a masked ciphertext and the operation parameter, or includes the ciphertext and a masked operation parameter, or includes a masked ciphertext and a masked operation parameter.

In other words, the obtained mask parameter includes a masked ciphertext and the operation parameter, or includes the ciphertext and a masked operation parameter, or includes a masked ciphertext and a masked operation parameter.

Optionally, a manner of the mask operation may be masking by addition or subtraction, masking by multiplication or division, masking by a hybrid operation or another operation, or the like, and is not enumerated exhaustively herein. Masking by addition is used as an example. An expression of the mask operation may be represented as $F(S)=(S+r) \mod N$, where S indicates an object to be masked, and r indicates a random number.

The hardware acceleration circuit 342 is configured to perform the first operation on the mask parameter to obtain a masked modular square value or a masked modular multiplication value.

Optionally, an expression of the first operation may be represented as $F(S)=m*S \mod N$, where S indicates an operand.

The unmask circuit 343 is configured to perform an unmask operation on the masked modular square value or the masked modular multiplication value to correspondingly obtain the modular square value or the modular multiplication value.

Still further, referring to FIG. 3, the arithmetic unit 340 shown in the figure may include a check circuit 344, configured to:

perform a second operation on the masked modular square value or the masked modular multiplication value to obtain a check value; and determine that the check value is equal to a preset value, where the preset value is m if the second operation is performed on the masked modular square value currently, or the preset value is m or C if the second operation is performed on the masked modular multiplication value currently.

Optionally, the hardware acceleration circuit 342 is specifically configured to: obtain the masked modular square value according to a formula $X2=m*X1 \mod N$, where X2 indicates the masked modular square value; or obtain the masked modular multiplication value according to a formula $Y2=m*Y1 \mod N$, where Y2 indicates the masked modular multiplication value.

Still optionally, the check circuit 344 is specifically configured to:

obtain the check value according to a formula $X3=(X2-m*r)*m^{-1} \mod N$ if the second operation is performed on the masked modular square value currently, where X3 indicates the check value; or obtain the check value according to a formula $Y3=(Y2-m*r)*m^{-1} \mod N$ if the second operation is performed on the masked modular multiplication value currently, where Y3 indicates the check value.

Still optionally, the unmask circuit 343 is specifically configured to:

obtain a modular square value X according to a formula $X=X2-m*r \mod N$ if the unmask operation is performed on the masked modular square value currently; or obtain a modular multiplication value Y according to a formula $Y=Y2-m*r \mod N$ if the unmask operation is performed on the masked modular multiplication value currently.

Optionally, referring to FIG. 3, the arithmetic unit 340 shown in the figure may further include a reset circuit 345, configured to: if the check value is not equal to the preset value, clear the ciphertext and the operation parameter and trigger the arithmetic unit to stop the operations. Further optionally, the random number is generated by a true random number generator, or the random number is generated by a pseudorandom number generator according to a seed after a true random number generator generates the seed.

It should be pointed out that, for examples and/or implementations not described in this embodiment, refer to the content described in FIG. 1 and FIG. 2. Details are not repeated herein again.

Figure 4:
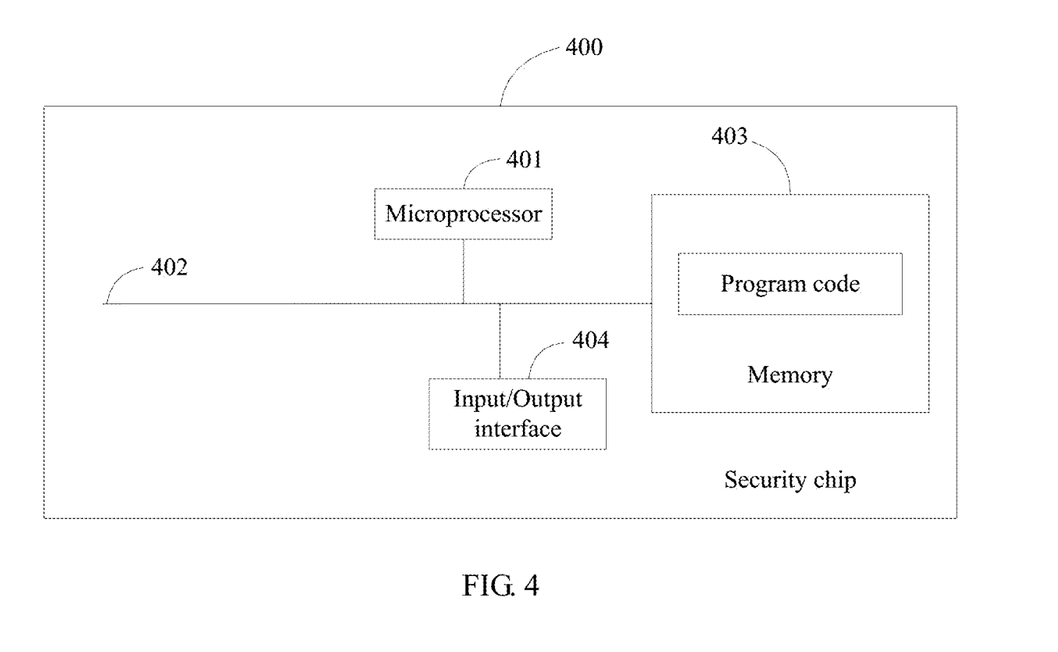
FIG. 4 is a schematic structural diagram of another security chip according to an embodiment of the present application.

FIG. 4 is a schematic structural diagram of another security chip in an embodiment of the present application.

As shown in FIG. 4, the security chip may include at least one microprocessor 401, such as a CPU, at least one transmission bus 402, a memory 403, and an input/output interface 404. The transmission bus 402 is configured to implement connection communication between these components. The memory 403 may be a high-speed RAM memory, or may be a non-volatile memory (non-volatile memory), for example, at least one magnetic disk memory. Optionally, the memory 403 may further be at least one storage apparatus far away from the microprocessor 401; and the input/output interface 404 is configured to perform data transmission with an external device, for example, to receive data. The memory 403 stores a set of program code, for example, HDL (Hardware Description Language, hardware description language), and the microprocessor 401 is configured to invoke the program code stored in the memory to perform the following steps:

obtaining an input ciphertext;

performing a modular exponentiation operation according to the ciphertext and a preset operation parameter; and using an operation result obtained after the modular exponentiation operation as a plaintext obtained after decryption.

The performing a modular exponentiation operation according to the ciphertext and a preset operation parameter includes:

breaking the modular exponentiation operation into multiple iterative first operations, where the first operation is a modular square operation or a modular multiplication operation;

performing the first operation according to the ciphertext and the operation parameter to obtain a modular square value or a modular multiplication value, where the operation parameter includes a parameter m and a modulus N that is preset to a fixed value; and if the current first operation is an initial first operation, m is a preset initial value; or if the current first operation is not an initial first operation, m is a modular square value or a modular multiplication value obtained after a previous first operation; and using a modular square value or a modular multiplication value obtained after an arithmetic unit performs the first operation for the last time, as the operation result of the modular exponentiation operation.

Optionally, the operation of performing, by the microprocessor 401, the first operation according to the ciphertext and the operation parameter to obtain a modular square value or a modular multiplication value is specifically:

performing a modular multiplication operation on m and N according to a formula $X=m^2$ mod N to obtain the modular square value, or performing a modular square operation on the ciphertext C, m, and N according to a formula $Y=m*C$ mod N to obtain the modular multiplication value.

Optionally, the operation of performing, by the microprocessor 401, the first operation according to the ciphertext and the operation parameter to obtain a modular square value or a modular multiplication value is specifically:

performing a mask operation on the ciphertext and/or the operation parameter by using a random number to obtain a mask parameter, where the mask parameter includes a masked ciphertext and the operation parameter, or includes the ciphertext and a masked operation parameter, or includes a masked ciphertext and a masked operation parameter;

performing the first operation on the mask parameter to obtain a masked modular square value or a masked modular multiplication value; and performing an unmask operation on the masked modular square value or the masked modular multiplication value to correspondingly obtain the modular square value or the modular multiplication value.

Optionally, before performing the unmask operation on the masked modular square value or the masked modular multiplication value to correspondingly obtain the modular square value or the modular multiplication value, the microprocessor 401 further performs the following operations:

performing a second operation on the masked modular square value or the masked modular multiplication value to obtain a check value; and determining that the check value is equal to a preset value, where the preset value is m if the second operation is performed on the masked modular square value currently, or the preset value is m or C if the second operation is performed on the masked modular multiplication value currently.

Further, the operation of performing, by the microprocessor 401, a mask operation on the ciphertext and the operation parameter by using a random number is specifically:

obtaining a masked value of m according to a formula $X1=(m+r)$ mod N, where X1 indicates the masked value of m, and r indicates the random number; and/or obtaining a masked value of C according to a formula $Y1=(C+r)$ mod N, where Y1 indicates the masked value of C, and r indicates the random number.

Still further, the operation of performing, by the microprocessor 401, the first operation on the mask parameter to obtain a masked modular square value or a masked modular multiplication value is specifically:

obtaining the masked modular square value according to a formula $X2=m*X1$ mod N, where X2 indicates the masked modular square value; or obtaining the masked modular multiplication value according to a formula $Y2=m*Y1$ mod N, where Y2 indicates the masked modular multiplication value.

Still further, the operation of performing, by the microprocessor 401, a second operation on the masked modular square value or the masked modular multiplication value to obtain a check value is specifically:

obtaining the check value according to a formula $X3=(X2-m*r)*m^{-1}$ mod N if the second operation is performed on the masked modular square value currently, where X3 indicates the check value; or obtaining the check value according to a formula $Y3=(Y2-m*r)*m^{-1}$ mod N if the second operation is performed on the masked modular multiplication value currently, where Y3 indicates the check value.

Still further, the operation of performing, by the microprocessor 401, an unmask operation on the masked modular square value or the masked modular multiplication value to correspondingly obtain the modular square value or the modular multiplication value is specifically:

obtaining a modular square value X according to a formula $X=X2-m*r$ mod N if the unmask operation is performed on the masked modular square value currently; or obtaining a modular multiplication value Y according to a formula $Y=Y2-m*r$ mod N if the unmask operation is performed on the masked modular multiplication value currently.

Optionally, after performing the second operation on the masked modular square value or the masked modular multiplication value to obtain the check value, the microprocessor 401 further performs the following operations:

if the check value is not equal to the preset value, clearing the ciphertext and the operation parameter and stopping the operations.

Still optionally, the random number is generated by a true random number generator, or the random number is generated by a pseudorandom number generator according to a seed after a true random number generator generates the seed.

It can be learned from the foregoing that, the security chip provided in this embodiment of the present application includes the input/output interface, the decryption circuit, the microprocessor, and the arithmetic unit. During a decryption process in which the security chip converts the ciphertext to the plaintext, the input/output interface first obtains the input ciphertext, the decryption circuit then performs the modular exponentiation operation according to the ciphertext and the preset operation parameter, and the microprocessor uses the operation result obtained after the modular exponentiation operation as the plaintext obtained after decryption. When performing the modular exponentiation operation according to the ciphertext and the preset operation parameter, the decryption circuit first breaks the modular exponentiation operation into multiple iterative first operations, where the first operation is the modular square operation or the modular multiplication operation, and then sends the ciphertext and the operation parameter to the arithmetic unit, and the arithmetic unit performs the first operation according to the ciphertext and the operation parameter to obtain the modular square value or the modular multiplication value. It can be learned that, same hardware (the arithmetic unit) may be used to obtain either the modular square value or the modular multiplication value, so that the two types of operations consume same power and cannot be differentiated according to power consumption. In this way, an SPA attack can be resisted and security can be improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely examples of embodiments of the present application, and certainly is not intended to limit the scope of the claims of the present application. Therefore, equivalent variations made in accordance with the claims of the present application shall fall within the scope of the present application.

What is claimed is:

1. An operation method applied to a security chip comprising an input/output interface, a decryption circuit, a microprocessor, and an arithmetic unit, the method comprising:
    obtaining, by the input/output interface, an input ciphertext;
    performing, by the decryption circuit, a modular exponentiation operation according to the ciphertext and a preset operation parameter, comprising:
        breaking, by the decryption circuit, the modular exponentiation operation into multiple iterative first operations, wherein the first operation is a modular square operation or a modular multiplication operation,
        sending, by the decryption circuit, the ciphertext and the operation parameter to the arithmetic unit, and
        performing, by the arithmetic unit, the first operation according to the ciphertext and the operation parameter to obtain a modular square value or a modular multiplication value, wherein the operation parameter comprises a parameter m and a modulus N that is preset to a fixed value, and if the current first operation is an initial first operation, m is a preset initial value, and if the current first operation is not an initial first operation, m is a modular square value or a modular multiplication value obtained after a previous first operation, and
    using, by the decryption circuit, the modular square value or the modular multiplication value obtained after the arithmetic unit performs the first operation for the last time, as an operation result of the modular exponentiation operation; and
    using, by the microprocessor, the operation result obtained after the modular exponentiation operation as a plaintext obtained after decryption.

2. The method according to claim 1, wherein performing, by the arithmetic unit, the first operation according to the ciphertext and the operation parameter to obtain a modular square value or a modular multiplication value comprises:
    performing, by the arithmetic unit, a modular square operation on m and N according to a formula $X=m^2$ mod N to obtain the modular square value; or
    performing a modular multiplication operation on the ciphertext C, m, and N according to a formula $Y=m*C$ mod N to obtain the modular multiplication value.

3. The method according to claim 1, wherein:
    the arithmetic unit comprises a mask circuit, a hardware acceleration circuit, and an unmask circuit; and
    performing, by the arithmetic unit, the first operation according to the ciphertext and the operation parameter to obtain a modular square value or a modular multiplication value comprises:
        performing, by the mask circuit, a mask operation on the ciphertext and/or the operation parameter by using a random number to obtain a mask parameter, wherein the mask parameter comprises: a masked ciphertext and the operation parameter; the ciphertext and a masked operation parameter; or a masked ciphertext and a masked operation parameter,
        performing, by the hardware acceleration circuit, the first operation on the mask parameter to obtain a masked modular square value or a masked modular multiplication value, and
        performing, by the unmask circuit, an unmask operation on the masked modular square value or the masked modular multiplication value to correspondingly obtain the modular square value or the modular multiplication value.

4. The method according to claim 3, wherein:
    the arithmetic unit further comprises a check circuit; and
    before performing, by the unmask circuit, an unmask operation on the masked modular square value or the masked modular multiplication value to correspondingly obtain the modular square value or the modular multiplication value, the method further comprises:
        performing, by the check circuit, a second operation on the masked modular square value or the masked modular multiplication value to obtain a check value, and
        determining, by the check circuit, that the check value is equal to a preset value, wherein the preset value is m if the second operation is performed on the masked modular square value currently, or the preset value is m or C if the second operation is performed on the masked modular multiplication value currently.

5. The method according to claim 4, wherein performing, by the mask circuit, a mask operation on the ciphertext and the operation parameter by using a random number comprises:
    obtaining, by the mask circuit, a masked value of m according to a formula X1=(m+r)mod N, wherein X1 indicates the masked value of m, and r indicates the random number; and/or
    obtaining, by the mask circuit, a masked value of C according to a formula Y1=(C+r)mod N, wherein Y1 indicates the masked value of C, and r indicates the random number.

6. The method according to claim 5, wherein performing, by the hardware acceleration circuit, the first operation on the mask parameter to obtain a masked modular square value or a masked modular multiplication value comprises:
    obtaining, by the hardware acceleration circuit, the masked modular square value according to a formula X2=m*X1 mod N, wherein X2 indicates the masked modular square value; or
    obtaining, by the hardware acceleration circuit, the masked modular multiplication value according to a formula Y2=m*Y1 mod N, wherein Y2 indicates the masked modular multiplication value.

7. The method according to claim 6, wherein performing, by the check circuit, a second operation on the masked modular square value or the masked modular multiplication value to obtain a check value comprises:
    obtaining, by the check circuit, the check value according to a formula X3=(X2−m*r)*m$^{-1}$ mod N, if the second operation is performed on the masked modular square value currently, wherein X3 indicates the check value currently; or
    obtaining, by the check circuit, the check value according to a formula Y3=(Y2−m*r)*m$^{-1}$ mod N, if the second operation is performed on the masked modular multiplication value currently, wherein Y3 indicates the check value.

8. The method according to claim 7, wherein performing, by the unmask circuit, an unmask operation on the masked modular square value or the masked modular multiplication value to correspondingly obtain the modular square value or the modular multiplication value comprises:
    obtaining, by the unmask circuit, a modular square value X according to a formula X=X2−m*r mod N if the unmask operation is performed on the masked modular square value currently; or
    obtaining, by the unmask circuit, a modular multiplication value Y according to a formula Y=Y2−m*r mod N if the unmask operation is performed on the masked modular multiplication value currently.

9. The method according to claim 4, wherein:
    the arithmetic unit further comprises a reset circuit; and
    after performing, by the check circuit, a second operation on the masked modular square value or the masked modular multiplication value to obtain a check value, the method further comprises:
        if the check value is not equal to the preset value, clearing, by the reset circuit, the ciphertext and the operation parameter and triggering stop of the operations.

10. The method according to claim 3, wherein:
    the random number is generated by a true random number generator; or
    the random number is generated by a pseudorandom number generator according to a seed after a true random number generator generates the seed.

11. A security chip, wherein the security chip comprises:
    an arithmetic unit;
    an input/output interface, configured to obtain an input ciphertext;
    a decryption circuit, configured to perform a modular exponentiation operation according to the ciphertext and a preset operation parameter, comprising:
        break the modular exponentiation operation into multiple iterative first operations, wherein the first operation is a modular square operation or a modular multiplication operation,
        send the ciphertext and the operation parameter to the arithmetic unit, wherein the arithmetic unit is configured to perform the first operation according to the ciphertext and the operation parameter to obtain a modular square value or a modular multiplication value, wherein the operation parameter comprises a parameter m and a modulus N that is preset to a fixed value, and if the current first operation is an initial first operation, m is a preset initial value and if the current first operation is not an initial first operation, m is a modular square value or a modular multiplication value obtained after a previous first operation, and
        use the modular square value or the modular multiplication value obtained after the arithmetic unit performs the first operation for the last time, as an operation result of the modular exponentiation operation; and
    a microprocessor, configured to use the operation result obtained after the modular exponentiation operation as a plaintext obtained after decryption.

12. The security chip according to claim 11, wherein the arithmetic unit is configured to:
    perform the modular square operation on m and N according to a formula X=m$^2$ mod N to obtain the modular square value; or
    perform the modular multiplication operation on the ciphertext C, m, and N according to a formula Y=m*C mod N to obtain the modular multiplication value.

13. The security chip according to claim 11, wherein the arithmetic unit comprises:
    a mask circuit, configured to perform a mask operation on the ciphertext and/or the operation parameter by using a random number to obtain a mask parameter, wherein the mask parameter comprises: a masked ciphertext and the operation parameter, the ciphertext and a masked operation parameter, or a masked ciphertext and a masked operation parameter;
    a hardware acceleration circuit, configured to perform the first operation on the mask parameter to obtain a masked modular square value or a masked modular multiplication value; and
    an unmask circuit, configured to perform an unmask operation on the masked modular square value or the masked modular multiplication value to correspondingly obtain the modular square value or the modular multiplication value.

14. The security chip according to claim 13, wherein the arithmetic unit further comprises a check circuit, configured to:
    perform a second operation on the masked modular square value or the masked modular multiplication value to obtain a check value; and determine that the check value is equal to a preset value, wherein the preset value is m if the second operation is performed on the masked modular square value currently, or the preset value is m or C if the second operation is performed on the masked modular multiplication value currently.

15. The security chip according to claim 14, wherein the mask circuit is configured to:

obtain a masked value of m according to a formula X1=(m+r)mod N, wherein X1 indicates the masked value of m, and r indicates the random number; and/or obtain a masked value of C according to a formula Y1=(C+r)mod N, wherein Y1 indicates the masked value of C, and r indicates the random number.

16. The security chip according to claim 15, wherein the hardware acceleration circuit is configured to:

obtain the masked modular square value according to a formula X2=m*X1 mod N, wherein X2 indicates the masked modular square value; or obtain the masked modular multiplication value according to a formula Y2=m*Y1 mod N, wherein Y2 indicates the masked modular multiplication value.

17. The security chip according to claim 16, wherein the check circuit is configured to:

obtain the check value according to a formula X3=(X2−m*r)*m mod N if the second operation is performed on the masked modular square value currently, wherein X3 indicates the check value; or obtain the check value according to a formula Y3=(Y2−m*r)*m$^{-1}$ mod N if the second operation is performed on the masked modular multiplication value currently, wherein Y3 indicates the check value.

18. The security chip according to claim 17, wherein the unmask circuit is configured to:

obtain a modular square value X according to a formula X=X2−m*r mod N if the unmask operation is performed on the masked modular square value currently; or obtain a modular multiplication value Y according to a formula Y=Y2−m*r mod N if the unmask operation is performed on the masked modular multiplication value currently.

19. The security chip according to claim 14, wherein the arithmetic unit further comprises a reset circuit, configured to:

if the check value is not equal to the preset value, clear the ciphertext and the operation parameter and trigger the arithmetic unit to stop the operations.

20. The security chip according to claim 13, wherein:

the random number is generated by a true random number generator; or the random number is generated by a pseudorandom number generator according to a seed after a true random number generator generates the seed.

* * * * *

UNITED STATES PATENT AND TRADEMARK OFFICE
CERTIFICATE OF CORRECTION

PATENT NO. : 10,601,577 B2
APPLICATION NO. : 16/258114
DATED : March 24, 2020
INVENTOR(S) : Cui Hu, ZhuFeng Tan and Shaojie Sun It is certified that error appears in the above-identified patent and that said Letters Patent is hereby corrected as shown below:

In the Claims

Column 19, Line 33, Claim 7, delete "N," and insert -- N --, therefor.

Column 19, Line 38, Claim 7, delete "N," and insert -- N --, therefor.

Column 21, Line 26, Claim 17, delete "m*r)*m" and insert -- m*r)*m$^{-1}$ --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*